June 9, 1964
R. CALVERT
3,136,161
TEMPERATURE MEASURING OR TEMPERATURE RESPONSIVE APPARATUS
Filed Aug. 2, 1961
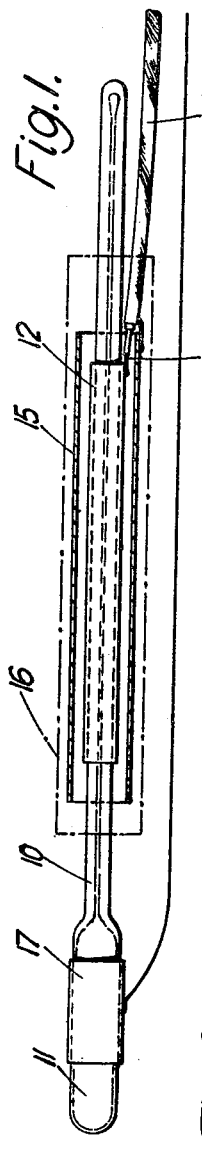
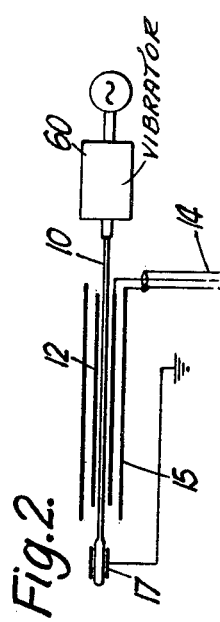
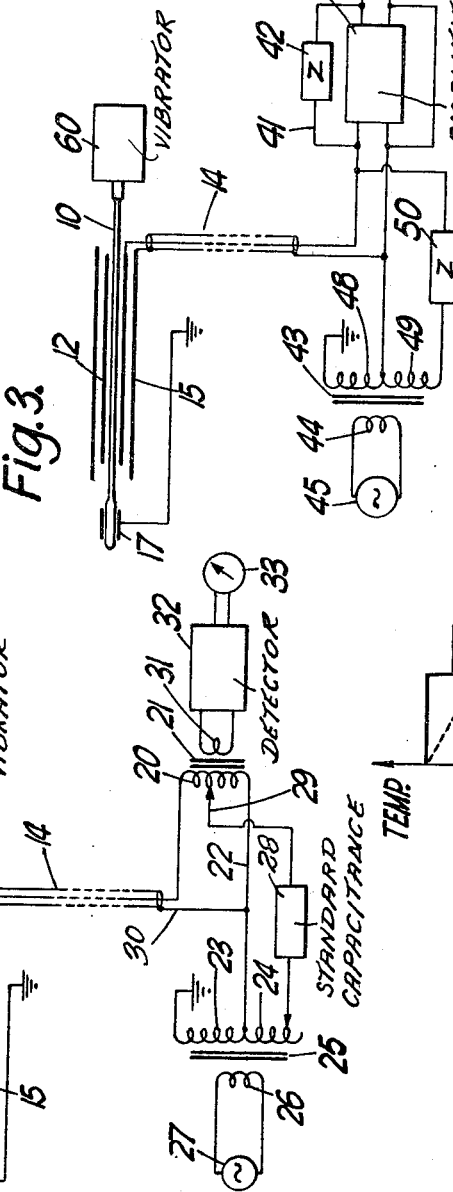
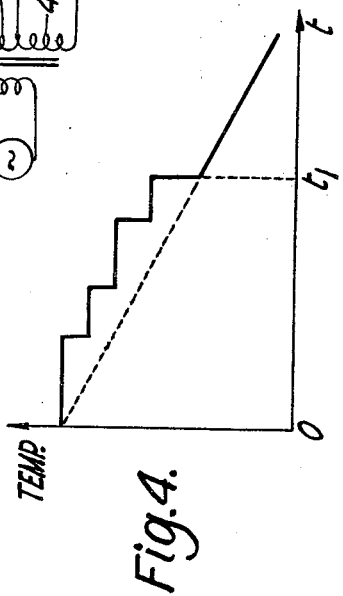

United States Patent Office 3,136,161
Patented June 9, 1964

3,136,161
TEMPERATURE MEASURING OR TEMPERATURE RESPONSIVE APPARATUS
Raymond Calvert, Chessington, Surrey, England, assignor to The Wayne Kerr Laboratories Limited, Chessington, England, a British company
Filed Aug. 2, 1961, Ser. No. 128,793
Claims priority, application Great Britain Aug. 3, 1960
19 Claims. (Cl. 73—362)

This invention relates to temperature measuring or temperature responsive apparatus and, according to the invention, in temperature measuring or temperature responsive apparatus comprising an expansible liquid in a tubular container, an electrically conductive liquid is employed in a non-conductive container, the liquid forming a first electrode and there are provided a second electrode formed of conductive material outside said tubular container adjacent a part thereof, a conductive screen over said second electrode, which screen extends axially in both directions beyond said second electrode, means for applying an alternating voltage between one of the electrodes and said screen and means responsive to the current between the other electrode and said screen resulting from the applied voltage. For temperature measuring apparatus, the means responsive to the current may comprise a current indicator.

The electrically conductive liquid very conveniently is mercury but other conductive liquids may be employed. The tubular container may be a tubular glass container and may be similar to that employed in a mercury-in-glass thermometer. For higher accuracy, however, a quartz tube may be employed. Quartz does not flow, as glass does, and thus a quartz tube will maintain its form whereas a glass tube gradually changes due to the flow of the glass, which flow limits the long-term accuracy of mercury-in-glass thermometer in cases where extremely high accuracy of measurement is required. In the arrangement of the present invention, it is not necessary to mark a scale on the tubular container nor is it essential to have a uniform bore provided there are no sudden discontinuities and thus it is possible to use a quartz tube.

When the liquid partly or wholly occupies the part of the container adjacent the second electrode, there is a capacitance between the liquid and this electrode. If, however, the liquid should not have reached that part of the tube of the container, the screen ensures that there is no effective capacitance between the liquid and the second electrode. The current in the responsive means is effectively dependent on the capacity between the liquid and the second electrode and, with this construction, it is possible to make the apparatus sensitive to very small changes in position of the liquid in the tube. The apparatus can thus provide a means of measuring temperature over the small range of temperatures in which the end of the liquid column in the tubular container lies adjacent the second electrode. The apparatus may be calibrated in exactly the same way as mercury in glass thermometers by immersing the tubular container with the second electrode and screen in a liquid at a known temperature and measuring the output current. If the tubular container is of accurately constant bore and if this calibration is effected at two temperatures, intermediate temperatures may be measured by measuring the output current. For many purposes, however, it will not be necessary to measure intermediate temperatures, for example when the apparatus is used to control the temperature of a tank or other body and, in that case, it is not necessary to have the container of accurately constant bore.

The invention is particularly applicable to the accurate measurement of temperature over a small range. It is well known to make mercury-in-glass thermometers which can measure temperature over a small range with an accuracy of the order of one thousandth of a degree centigrade. The apparatus of the present invention may, for example, comprise such a mercury-in-glass thermometer or mercury in a quartz tube in combination with the additional electrode and screen and the voltage source and current measuring means. The current measuring means can be arranged to enable a direct reading to be obtained of the position of the mercury in the tube with an accuracy at least as good as can be obtained by visual inspection of a simple mercury-in-glass thermometer and it is possible using the apparatus of the present invention to determine the position of the mercury far more accurately than by visual inspection.

The second electrode with the conductive screen may be movably positioned on the tubular container so as to enable temperature measurement to be made over a selected range at any point within the over-all range permitted by the liquid in the container.

The screen may be earthed but often it may be more convenient to have the liquid in the container electrically connected to earth either directly by direct contact of the liquid with an earthed electrode passing through the container or effectively by capacitive coupling through the walls of the container to a suitable earthed electrode. The electrical connections to the second electrode and screen may conveniently be made using a coaxial cable with the outer conductor connected to the screen. The cable capacitance will not affect the measurement of the interelectrode capacitance, if this is determined, as previously described, by applying an alternating voltage between one electrode, conveniently the liquid, and the screen and measuring the output current between the other electrode and the screen.

If the apparatus embodies a conventional type of mercury-in-glass thermometer it is convenient to be able to see the markings on the glass and for this purpose the second electrode and the screen may be part cylinders surrounding the thermometer tube with aligned axial slits so that the graduations on the tube can be viewed through the slits. Instead of using such slits, however, the second electrode on the screen may be formed of conductive glass arranged as sleeves around the tubular container. A transparent second electrode and a transparent screen may alternatively each be formed by making use of double walled tubes of transparent material, for example glass, with a conductive liquid between the walls.

With a mercury-in-glass or mercury-in-quartz thermometer and in general with thermometers using a liquid in a narrow bore tube, the level of the liquid changes in discrete steps due to the liquid sticking to the container. These steps may typically be of the order of a few millidegrees on a centrigrade scale and this puts a limit to the accuracy of measurement using such thermometers for measuring changing temperatures by reference to a visually observed graduated scale on the tube. Because of such sticking different calibrations may be required for measuring rising and falling temperatures in order to get the best possible accuracy using visual observations. With the arrangement of the present invention it is not essential to be able to read the position of the liquid in the container visually in order to take a measurement and means may be provided for vibrating the container. This prevents the liquid sticking in the container and thus enables a more accurate reading to be obtained.

The means for measuring the current between an electrode and the screen may comprise a null balance detector and means for feeding said current into the detector in opposition to an adjustable standard current. The adjustable standard current might comprise a current derived from an adjustable standard voltage source fed through a fixed or adjustable standard impedance or a current from a known constant voltage source fed through an adjustable standard impedance. In one such arrangement, for example, an input transformer having two secondary windings or a suitably tapped secondary winding may be provided for applying alternating voltages of known ratio between one of the electrodes and the screen and between the screen and one terminal of an adjustable standard impedance, for example a standard capacitor. By using a transformer, the voltage ratio is known, thereby obviating any need to know the absolute value of the voltages applied to the electrode and to the standard impedance. The second electrode and the second terminal of the standard impedance may be connected to one input terminal of a detector the second terminal of which is connected to the screen. Conveniently an output transformer is used to apply the currents to the detector and, in this case, the standard impedance and the electrode may be connected to different taps on a primary winding of the transformer to form ratio arms, the transformer having a secondary winding connected to a null balance detector.

In another arrangement for measuring the current between said other electrode and the screen, this current is fed into the input of a high gain amplifier having a feedback circuit applying the output voltage of the amplifier through an impedance into the amplifier input in opposition to the aforementioned current between said other electrode and said screen. Provided the amplifier has sufficiently high gain, the net input to the amplifier will be substantially zero and the amplifier output voltage will be proportional to the current to be measured. This output voltage may be measured by a suitable meter either measuring the voltage across the output terminals of the amplifier or measuring the current in the feedback circuit.

In some cases it may be convenient partially to balance the current to be measured by combining it in opposition with a known current, for example in the manner described above with reference to a null balance detection system, thereby obtaining a coarse balance, and to measure the out-of-balance current. Ths out-of-balance current may be measured by feeding it into a high gain amplifier with negative feedback and measuring the amplifier output voltage or feedback current.

Since the output of the measuring apparatus is an electrical signal, this apparatus may very conveniently be used for controlling the temperature of a body, for example a tank of liquid, the output current from the measuring apparatus being applied to a suitable servo system for controlling the temperature of the tank to maintain the latter at a constant level.

In the following description reference will be made to the accompanying drawings in which:

FIGURE 1 is a diagram illustrating the construction of part of a temperature measuring or temperature responsive apparatus;

FIGURES 2 and 3 are circuit diagrams illustrating two alternative electrical circuits which might be employed with the apparatus of FIGURE 1; and FIGURE 4 is a graphical diagram illustrating a relationship between temperature and output signal.

Referring to FIGURE 1, there is shown an apparatus which includes a mercury-in-glass or mercury-in-quartz thermometer having a stem 10 comprising the glass or quartz tube with a narrow bore and a bulb 11 at one end. This thermometer may be of conventional construction. Surrounding part of the tube 10 is a first electrode 12, which may conveniently be referred to as the current electrode and which is electrically connected at 13 to the inner conductor of an insulated coaxial cable 14. This current electrode 12 is of tubular form surrounding the thermometer stem 10. If desired it may have an axial slit along its length in order that the position of the mercury and calibration markings along the length of the thermometer stem may be seen. Around the current electrode 12 is an electrically conductive screen 15 which is electrically insulated from the current electrode conveniently by embedding the current electrode and screen in a resin casting indicated at 16. If the electrode 12 has an axial slit for viewing graduation markings on the tube 10, the screen 15 would be provided with an aligned slit. Alternatively the electrode 12 and screen 15 may be made of transparent material, conveniently conductive glass. The screen 15 is electrically connected to the outer conductor of the aforementioned coaxial cable 14. The mercury in the bulb 11 is capacitively coupled to an electrode indicated diagrammatically at 17, which electrode is earthed.

FIGURE 2 illustrates one form of electrical measuring circuit for use with the apparatus of FIGURE 1. As shown in FIGURE 2 the inner conductor of the coaxial cable 14 is connected to one end of a primary winding 20 on a transformer 21. The other end of this winding 20 is connected, by a lead 22, to the junction between two secondary windings 23, 24 of an input transformer 25. This transformer 25 has a primary winding 26 connected to a source 27 of alternating current. The end of the winding 23 remote from the lead 22 is connected to earth and hence is effectively connected to the aforementioned voltage electrode 17. The end of the winding 24 remote from the lead 22 is connected, via an adjustable standard capacitance 28, to a tap 29 on the aforementioned winding 20. The lead 22 is connected as indicated at 30 to the outer of the aforementioned coaxial cable 14. The transformer 21 has a secondary winding 31 connected to a detector 32 with a null balance indicator 33. It will be seen that the circuit arrangement of FIGURE 2 forms a transformer ratio arm bridge. The winding 23 applies a voltage between the voltage electrode 17 and the screen 15. The resultant current flowing between the current electrode 12 and the screen 15 depends on the capacity between the mercury and the current electrode and hence on the position of the mercury. The bridge thus measures the capacitance between the mercury in the thermometer and the current electrode 12 comparing this capacity with the adjustable standard capacitance 28. The adjustable standard may be altered or the tap 29 altered until a null balance indication is obtained on the indicator 33. The relative numbers of turns on the windings of the input transformer, the position of the tap 29 and the magnitude of the capacitance 28 are then a measure of the capacitance between the mercury in the thermometer and the current of electrode 12 and thus a measure of the temperature of the mercury.

For some purposes it may be preferable to have an electrical output signal which is dependent on the measured capacitance and FIGURE 3 illustrates one form of electrical circuit for this purpose. In FIGURE 3 the inner and outer conductors of the coaxial cable 14 are connected to the input terminals of a high gain amplifier 40. This amplifier has a feedback circuit 41 including a standard impedance 42 for applying the output voltage of the amplifier into the amplifier input in opposition to the current between the electrode 12 and the screen 15. An alternating voltage is applied to the voltage electrode 17 by means of an input transformer 43 having an input winding 44 connected to an alternating current supply source 45 and having two secondary windings 48, 49. One end of the winding 48 is connected to earth and the other to the outer conductor of the cable 14 so that the voltage across the winding 48 is applied between the screen 15 and the voltage electrode 17. Provided the amplifier 40 has a sufficiently high gain the net input to the amplifier will be substantially zero and the amplifier output voltage will be proportional to the current to be measured, that is the current flowing into the current electrode 12. This output voltage may be measured by a suitable meter 46 measuring the voltage across the output terminals of the amplifier or by a current indicator in the feedback circuit. It may often be convenient partially to balance the current to be measured by combining it in opposition with a known current thereby obtaining a coarse balance and to measure the out-of-balance current. For this purpose there is provided a further secondary winding 49 on the transformer 43 for applying a voltage to a standard impedance 50 and hence feeding a standard current into the amplifier input 40.

The output of the measuring apparatus of FIGURE 3 is an electrical signal representative of the temperature to be measured and this apparatus may very conveniently be used for controlling the temperature of a body. For example, to control the temperature of a tank of liquid the output current from the amplifier 40 may be applied to a suitable servo system operating a heater for heating the contents of the tank.

Since the electrical measurements of temperature can be effected without seeing the thermometer or any markings thereon it is possible to vibrate the thermometer to avoid the mercury sticking in the tube. Such vibrating means are illustrated diagrammatically at 60 in FIGURES 2 and 3 and may conveniently comprise a moving coil vibrator similar, for example, to that used in a loudspeaker for reproducing audio frequency signals. The vibrator may be energised at any convenient frequency, typically within the range of 50 cycles per second to a few thousand cycles per second. In practice if alternating current supply mains at 50 to 60 cycles per second are available, this supply mains frequency may conveniently be used for operating the vibrator. It has been found preferable to effect the vibration in the direction of the axis of the thermometer tube. A vibration amplitude of a few thousandths of an inch has been found satisfactory. The effect of such a vibrator is illustrated in FIGURE 4. FIGURE 4 is part of a graph showing electrical output reading plotted as ordinate against time scale as abscissa for a measurement using the apparatus in a liquid whose temperature is cooling. In the initial part of this cooling period the vibrator was switched off. It will be seen that in the initial part of the graph up to the time $t_1$, the reading representing the temperature falls in a series of steps. These steps might typically be of the order of a few millidegrees on a centigrade scale. After the time $t_1$ at which the vibrator was switched on, the reading falls in a smooth curve without any noticeable steps thereby showing that this source of error in temperature measurement is substantially eliminated by the use of a vibrator. This vibrator is of particular advantage in calorimetry work where a heat pulse is applied. It is commonly found in such work that there is a delay before the temperature measurement starts to fall and the measurement then falls in steps when readings are taken in a mercury-in-glass or mercury-in-quartz thermometer. Using the apparatus of the present invention with a vibrator the temperature rises sharply to a maximum and then immediately begins to fall steadily.

I claim:

1. Temperature measuring or temperature responsive apparatus comprising an expansible liquid in a tubular container, wherein an electrically conductive liquid is employed in a non-conductive container, the liquid forming a first electrode and wherein there are provided a second electrode formed of conductive material outside said tubular container adjacent a part thereof, a conductive screen over said second electrode, which screen extends axially in both directions beyond said second electrode, means for applying an alternating voltage between one of the electrodes and said screen and means responsive to the current between the other electrode and the screen resulting from the applied voltage.

2. Apparatus as claimed in claim 1 wherein said container is a glass tube.

3. Apparatus as claimed in claim 1 wherein said container is a quartz tube.

4. Apparatus as claimed in claim 1 wherein said second electrode with the conductive screen are movably positioned on the tubular container to enable temperature measurement to be made over a selected range at any point within the overall range permitted by the liquid in the container.

5. Apparatus as claimed in claim 1 wherein said screen is earthed.

6. Apparatus as claimed in claim 1 wherein the liquid is capacitively coupled to an earthed electrode.

7. Apparatus as claimed in claim 1 wherein electrical connections to the second electrode and screen are made using a coaxial cable with the outer conductor connected to the screen.

8. Apparatus as claimed in claim 1 and having graduations marked on said tubular container wherein the second electrode and the screen are part cylinders surrounding the tubular container with aligned axial slits so that the graduations can be viewed through the slits.

9. Apparatus as claimed in claim 1 wherein the second electrode and the screen are formed of transparent material.

10. Apparatus as claimed in claim 9 wherein the second electrode and the screen are formed of conducting glass arranged as sleeves extending around the tubular container.

11. Temperature measuring or temperature responsive apparatus comprising an electrically conductive expansible liquid in a non-conductive tubular container, the liquid forming a first electrode and wherein there are provided a second electrode formed of conductive material outside said tubular container adjacent a part thereof, a conductive screen over said second electrode, which screen extends axially in both directions beyond said second electrode, means for applying an alternating voltage between one of the electrodes and said screen, means responsive to the current between the other electrode and the screen resulting from the applied voltage, and means for vibrating said tubular container.

12. Apparatus as claimed in claim 1 wherein the means for measuring the current between an electrode and the screen comprises a null balance detector and means for feeding said current into the detector in opposition to an adjustable standard current.

13. Apparatus as claimed in claim 12 wherein the means for applying an alternating current between one of the electrodes and the screen comprises an input transformer having windings for applying alternating voltage of known ratio between one of the electrodes and the screen and between the screen and one terminal of a standard impedance and wherein means are provided for feeding the currents from said other electrode and from the standard impedance into said detector in opposition.

14. Apparatus as claimed in claim 1 wherein said means responsive to the current between said other electrode and the screen comprises means for feeding this current into the input of a high gain amplifier having a feedback circuit applying the output voltage of the amplifier through an impedance into the amplifier input in opposition to the aforementioned current between said other electrode and said screen.

15. Apparatus as claimed in claim 14 wherein there are provided means for measuring the output voltage of the amplifier.

16. Temperature measuring or temperature responsive apparatus comprising an electrically conductive expansible liquid in a non-conductive tubular container, the liquid forming a first electrode and wherein there are provided a second electrode formed of conductive material outside said tubular container adjacent a part thereof, a conductive screen over said second electrode which screen extends axially in both directions beyond said second electrode, means for applying a reference alternating voltage directly between one of the electrodes and said screen, a current responsive device to which is fed the current between the other electrode and said screen resulting from the applied voltage between said one electrode and the screen, and a balancing circuit arranged to feed a balancing current to said current responsive device in opposition to the current between the other electrode and screen so that the current responsive device presents a low impedance to said resulting current between said other electrode and the screen.

17. Apparatus as claimed in claim 16 wherein said balancing circuit comprises a standard impedance and means for applying to the standard impedance an alternating voltage of the same frequency as and in known amplitude ratio to said reference voltage and wherein said current responsive device comprises a null detector for indicating equality of the current between said other electrode and said screen and the current through said balancing circuit.

18. Apparatus as claimed in claim 16 wherein said current responsive device responsive to the current between said other electrode and the screen comprises a high gain amplifier having an input and an output, means to feed into said input the current between said other electrode and the screen, and wherein said balancing circuit comprises a feedback circuit which includes an impedance and which extends from the output to the input of the amplifier, said feedback circuit being arranged to apply the output voltage of the amplifier through said impedance into the amplifier input in opposition to the aforesaid current between said other electrode and said screen.

19. Temperature measuring or temperature responsive apparatus comprising an electrically conductive expansible liquid in a non-conductive tubular container, the liquid forming a first electrode and wherein there are provided a second electrode formed of conductive material outside said tubular container adjacent a part thereof, a conductive screen over said second electrode which screen extends axially in both directions beyond said second electrode, means for applying a reference alternating voltage directly between one of the electrodes and said screen, a current responsive device to which is fed the current between the other electrode and said screen resulting from the applied voltage between said one electrode and the screen, a balancing circuit arranged to feed a balancing current to said current responsive device in opposition to the current between the other electrode and screen so that the current responsive device presents a low impedance to said resulting current between said other electrode and the screen, and means for vibrating said tubular container.

References Cited in the file of this patent

UNITED STATES PATENTS

| 2,950,426 | Frome | Aug. 23, 1960 |
| 3,022,665 | Smith | Feb. 27, 1962 |

FOREIGN PATENTS

| 818,881 | Great Britain | Aug. 26, 1959 |
| 1,208,554 | France | Nov. 7, 1960 |